June 23, 1942.  H. H. PACKWOOD  2,287,126
LAWN MOWER
Filed Sept. 13, 1941

INVENTOR
HEZA H. PACKWOOD
BY
ATTORNEY

Patented June 23, 1942

2,287,126

UNITED STATES PATENT OFFICE 2,287,126

LAWN MOWER

Heza H. Packwood, Reserve, La.

Application September 13, 1941, Serial No. 410,707

5 Claims. (Cl. 56—25.4)

The general object of the present invention is to provide an improved lawn mower with cutting means formed and disposed to cut grass and other vegetation which is under and adjacent fences, shrubbery and other objects which would prevent such vegetation from being cut by a lawn mower of the usual type.

My improved lawn mower is characterized in particular by the form of its cutting means, and by the disposition of the latter relative to the rolling ground engaging means which support the framework on which the cutting means and a driving motor are mounted.

In its preferred form, my improved lawn mower includes a cutter mounted on the lawn mower frame to rotate about a vertical axis and comprises an upper inner section and a depending outer section which has a lower cutter blade portion, and the frame supporting means comprises a rolling, ground engaging element preferably in the form of a ground roller located within the path of movement of the rotating cutter. In the preferred form of the lawn mower, said ground engaging element is pivotally connected to a vertical post which extends through a central opening in the cutter, and is telescopically received and adjustably secured in a tubular portion of the lawn mower frame co-axial with said central cutter opening.

In its preferred form, my improved lawn mower also comprises a pair of side ground engaging wheels positioned relative to the cutter and the said ground engaging element and the cutter driving motor in a manner hereinafter described which contributes to a desirable structural compactness and to easy maneuverability of the lawn mower, and the proper disposition of the cutter relative to the ground surface notwithstanding considerable irregularities in the latter The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Figure 1:
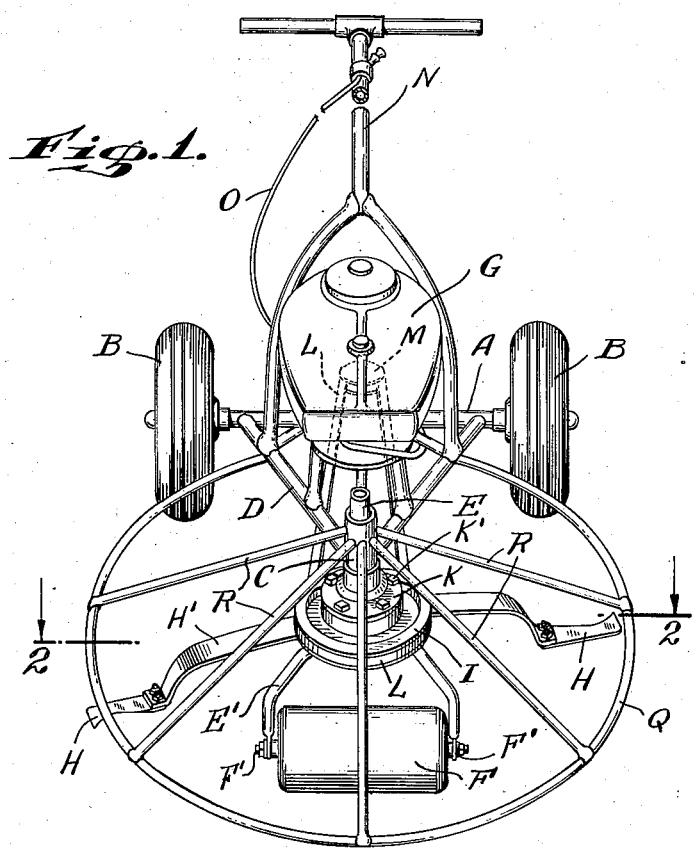
Fig. 1 is a perspective view of a lawn mower.
Figure 2:
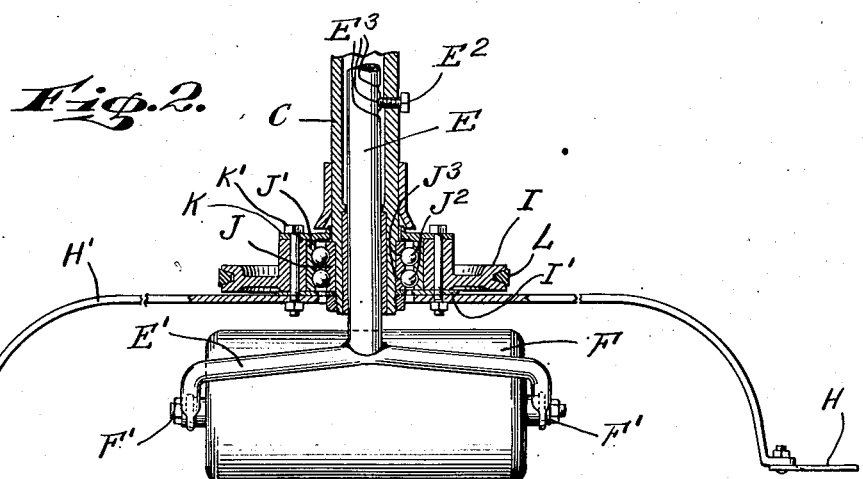
Fig. 2 is a vertical section through the axis of the rotating cutter structure of the lawn mower.

In its preferred form shown in the drawing, my improved lawn mower comprises a horizontally disposed axle A with wheels B journaled thereon and show as having rubber tires, and also comprises a tubular vertically disposed part C which is laterally displaced from the axle A, the part C and axle A being connected to and forming parts of a rigid framework D. The part C forms a support or tubular shaft on which the cutter of the motor is mounted to rotate about a vertical axis. The part C also telescopically receives a post E through which a ground roller F is connected to the lawn mower frame and assists in supporting the latter. A cutter driving motor G, which ordinarily is an internal combustion engine, is mounted on the framework D preferably adjacent to axle A so that the center of gravity of the lawn mower may be between the ground motor and the axle A, but suitably close to the latter to permit the lawn mower frame to be readily tilted about the axle A to raise the ground roller F notwithstanding the gravitational force tending to hold the ground roller in contact with the ground.

As shown the ground roller F has aligned, horizontal trunnion pivots F' journaled in a yoke E' rigidly connected to the post E and the latter is releasably clamped in the tubular supporting part C by a jam bolt or set screw $E^2$ extending through a threaded opening in the wall of the support C. As shown the post E is formed with a row of longitudinally displaced sockets or recesses $E^3$ and the screw $E^2$ is extended into one or another of the recesses $E^3$ depending on the desired vertical adjustment of the cutter mechanism relative to the ground level. Preferably and as shown the yoke E' extends transversely away from the axis of the post E and from the axle A, so that the axis of rotation of the ground roller F is laterally displaced from the vertical cutter axis in a direction opposite to that of the displacement of the axle A from said vertical axis. As hereinafter explained, the described relative arrangement of the ground roller cutter and wheel axis contributes to desirable lawn mower compactness and maneuverability.

As shown, the rotary cutter structure of the lawn mower comprises a pair of horizontally disposed cutting blades H secured to the ends of a cutter carrier H' in the form of a metal bar comprising a central generally horizontal section above the ground roller F and depending outer end portions. The latter are displaced from the cutter axis so that they may rotate about the ground roller with the cutting blades H as close to the ground surface as may be desired. The central section of the bar H' is formed with an opening through which the tubular frame part C extends, and is bolted or otherwise secured against the underside of a pulley I. The latter surrounds the lower end of the tubular part C and is journaled thereon by means of a double row ball bearing. The latter comprises inner and outer ball ring members J and J' and bearing balls $J^2$.

The member J is fitted on the lower end of the tubular support C and is secured between an upper shoulder portion of the support C and a clamping nut $J^3$ threaded on the lower end of the support. The outer ball ring J' extends through a central opening in the pulley I and is secured therein by means including a metal disc I' interposed between the pulley I and the cutter blade carrier H', an upper annular clamping or housing member K and clamping bolts K'. The ball rings J and J' are shaped to provide an upper pair and a lower pair of juxtaposed ball grooves or races $J^3$, each receiving a corresponding set of bearing rolls $J^2$ and extending circularly about the axis of the tubular cutter support C.

As shown, the pulley I, and thereby the cutter blades H, are rotated about their common vertical axis, by means shown as comprising a belt L connecting the cutter pulley I and a pulley M carried by the driving shaft of the engine G. The lawn-mower is adapted to be moved manually over the ground through a handle member N which may be of the usual lawn-mower form and connected to the lawn mower framework in the usual manner. As shown, an engine controlling element O which may be of a well known type has its operating end supported by the handle N in position for ready manipulation by the operator to thereby start and stop the engine G and also to vary the speed of the engine G, if the latter is not provided with an automatic speed governor as is usual.

A circular cutter guard Q shown as a metal rod extends circularly about the axis of cutter rotation, alongside, and in close proximity to but slightly above, the path of movement of the outer ends of the cutter blades H. As shown, the guard member P is in the form of a circular arc of a little less than 360° and has its ends connected to a portion of the framework D between the axle A and cutter support C. At points distributed along its length, the guard Q is connected to the cutter support C by spoke like members R.

Advantageously and as shown, the internal combustion engine G extends over the main axle A in the normal condition of the apparatus so that the center of gravity of the lawn mower structure is horizontally displaced from the axle A toward the ground roller for a relatively short horizontal distance only. This makes it easy for the operator to move the lawn mower about as conditions make desirable. With its center of gravity so located the lawn mower may easily be tilted to raise the cutter above a rock or the like extending upward from the ground level or to temporarily raise the cutting or trimming level relative to the ground level. Moreover with the center of gravity close to the axle A, the normal pressure with which the ground roller F bears on the ground is not great enough to interfere with the easy skidding movement of the latter required for curvilinear movement of the cutter over the ground. As the lawn mower wheels B are free to turn in either direction relative to the axle A, the relative movements of the two wheels and thereby the direction of movement of the vertical cutter axis over the ground, can be readily varied between the straight line movement produced where the two wheels B rotate in the same direction with the same velocity and the circular movement produced when the wheels B rotate with equal velocities in opposite directions.

As is plainly apparent my improved lawn mower is well adapted to cut grass under shrubbery and fence portions only a few inches above the surface of the ground, and grass close to fence portions or other objects which are in contact with and extend upward from the ground surface. The elevation of the cutter blades above the ground surface level can be readily varied as conditions make desirable. With the relatively high rotative speed of the cutter blades made possible by the use of the driving engine G and the fact that the cutter blade rotation speed is independent of the movement of the lawn mower over the ground, the lawn mower is well adapted not only to cut the grass growing on a lawn, but also to smooth out the surface irregularities of the lawn.

The lawn mower construction illustrated and described is relatively simple and inexpensive to produce. With the lawn mower wheels B spaced apart, as shown, by a distance greater than the radius and less than the diameter of the circular path of movement of the tips of the cutter blades H, and with its wheels B engaging the ground outside of but near to said path and with the ground roller F within said path and near to the portion of the path at the opposite side of the vertical cutter axis from the wheels B, the lawn mower may have about the maximum degree of compactness and maneuverability practically possible with a given radial displacement of the cutter blade tips from the vertical cutter axis. The described relative location of the ground roller and cutting blades also minimizes blade and ground contact in the normal movement of the lawn mower over an irregular ground surface.

While in accordance with the provisions of the statutes I have illustrated and described the best form of my invention now known to me, it will be apparent to those skilled in the art that changes may be made in the form of the apparatus disclosed without departing from the spirit of the invention as set forth in the appended claims, and that in some features of the invention may sometimes be used to advantage with a corresponding use of other features.

Having now described my invention, what I claim as new and desire to secure by Letters Patent, is:

1. In a lawn mower, the combination with a frame, of supporting means therefor including a rolling, ground engaging element, means connected to said frame to which said element is pivotally connected for rotative movement about a horizontal axis, a cutter comprising an upper section, a lower cutting blade section, and a depending intermediate section extending between and rigidly connected to each of the two first mentioned sections, and means pivotally connecting said upper cutter section to said frame for rotative movement of the cutter about a vertical axis, said cutter and ground engaging element being so relatively formed and disposed that in the rotative movement of the cutter said upper section moves along a path extending over said element and in close proximity to the upper side of the latter, and said depending cutter portion moves along a path surrounding an upper portion of said element and said cutter blade section moves along a path extending radially outwardly from the path of said depending portion.

2. A lawn mower combination as specified in claim 1, comprising frame supporting, rolling ground engaging means at the opposite side of the vertical axis from said ground engaging element and comprising a cutter driving motor mounted on said frame and subjecting the latter to a tilting force opposing the gravitational force, tending to hold said element in engagement with the ground.

3. In a lawn mower, the combination with a frame including a vertically disposed tubular part, of supporting means for said frame including a rolling, ground engaging element, a member connecting said element to said frame and comprising an upper post portion extending into said tubular frame part and comprising a lower portion to which said element is pivotally connected for rotative movement about a horizontal axis, a cutter comprising an upper section, a lower cutting blade section, and a depending intermediate section extending between and rigidly connected to each of the two first mentioned sections, and means pivotally connecting said upper cutter section to said frame for rotative movement of the cutter about a vertical axis, said cutter and ground engaging element being so relatively formed and disposed that in the rotative movement of the cutter said upper section moves along a path extending over said element and in close proximity to the upper side of the latter, and said depending cutter portion moves along a path surrounding an upper portion of said element and said cutter blade section moves along a path extending radially outwardly from the path of said depending portion.

4. A lawn mower combination as specified in claim 3 including means for connecting said post portion in said tubular frame part in different relative vertical adjustments.

5. In a lawn mower, the combination with a frame, of supporting means therefor including a rolling, ground engaging element, a connection member comprising an upper portion connected to said frame, and a lower portion to which said element is pivotally connected for rotative movement about a horizontal axis, a cutter comprising an upper section, a lower cutting blade section, and a depending intermediate section extending between and rigidly connected to each of the two first mentioned sections, and annular bearing means surrounding said upper member portion and pivotally connecting said upper cutter section to said frame for rotative movement of the cutter about a vertical axis, said cutter and ground engaging element being so relatively formed and disposed that in the rotative movement of the cutter said upper section moves along a path extending over said element and in close proximity to the upper side of the latter, and said depending cutter portion moves along a path surrounding an upper portion of said element and said cutter blade section moves along a path extending radially outwardly from the path of said depending portion.

HEZA H. PACKWOOD.